US007721148B2

(12) United States Patent
Brenden et al.

(10) Patent No.: US 7,721,148 B2
(45) Date of Patent: May 18, 2010

(54) METHOD AND APPARATUS FOR REDIRECTION OF MACHINE CHECK INTERRUPTS IN MULTITHREADED SYSTEMS

(75) Inventors: Scott Brenden, Bothell, WA (US); Suresh Marisetty, Fremont, CA (US); Kushagra Vaid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 989 days.

(21) Appl. No.: 11/478,797

(22) Filed: Jun. 29, 2006

(65) Prior Publication Data

US 2008/0005615 A1    Jan. 3, 2008

(51) Int. Cl.
    *G06F 13/24*    (2006.01)
(52) U.S. Cl. .................... 714/11; 714/10; 718/108; 710/15; 710/268
(58) Field of Classification Search ............. 714/10, 714/11, 13; 710/268, 15; 718/108
    See application file for complete search history.

(56) References Cited

U.S. PATENT DOCUMENTS

| | | | | |
|---|---|---|---|---|
| 5,588,131 | A * | 12/1996 | Borrill | 711/146 |
| 6,622,260 | B1 | 9/2003 | Marisetty et al. | |
| 7,353,445 | B1 * | 4/2008 | Barreh et al. | 714/758 |
| 2003/0023656 | A1 * | 1/2003 | Hutchison et al. | 709/100 |
| 2003/0046464 | A1 * | 3/2003 | Murty et al. | 710/260 |
| 2003/0074601 | A1 * | 4/2003 | Schultz et al. | 714/15 |
| 2003/0120791 | A1 * | 6/2003 | Weber et al. | 709/231 |
| 2003/0196042 | A1 * | 10/2003 | Hopeman et al. | 711/133 |
| 2003/0225816 | A1 * | 12/2003 | Morrow et al. | 709/107 |
| 2004/0078735 | A1 * | 4/2004 | Quach | 714/57 |
| 2004/0221193 | A1 * | 11/2004 | Armstrong et al. | 714/10 |
| 2004/0221196 | A1 * | 11/2004 | Datta et al. | 714/13 |
| 2005/0015661 | A1 * | 1/2005 | Vaidyanathan | 714/13 |
| 2005/0015672 | A1 * | 1/2005 | Yamada | 714/38 |
| 2005/0132376 | A1 * | 6/2005 | Rodgers et al. | 718/100 |
| 2005/0210472 | A1 * | 9/2005 | Accapadi et al. | 718/105 |
| 2005/0246461 | A1 * | 11/2005 | Accapadi et al. | 710/200 |
| 2006/0107114 | A1 * | 5/2006 | Michaelis et al. | 714/25 |
| 2006/0112208 | A1 * | 5/2006 | Accapadi et al. | 710/265 |
| 2006/0130062 | A1 * | 6/2006 | Burdick et al. | 718/100 |
| 2006/0242389 | A1 * | 10/2006 | Browning et al. | 712/229 |
| 2007/0043531 | A1 * | 2/2007 | Kosche et al. | 702/182 |
| 2007/0061618 | A1 * | 3/2007 | Helmich et al. | 714/11 |
| 2007/0061634 | A1 * | 3/2007 | Marisetty et al. | 714/48 |
| 2007/0088887 | A1 * | 4/2007 | McFarland et al. | 710/260 |
| 2007/0094664 | A1 * | 4/2007 | So et al. | 718/103 |
| 2007/0101332 | A1 * | 5/2007 | Courchesne et al. | 718/102 |
| 2007/0239917 | A1 * | 10/2007 | Orita et al. | 710/268 |

OTHER PUBLICATIONS

Section 5.8.3.8 and Section 13.3.1 of Intel® Itanium® Architecture Software Developer's Manual—vol. 2: System Architecture, Revision 2.2, available at http://developer.intel.com/design/itanium/manuals/245318.htm.

(Continued)

*Primary Examiner*—Scott T Baderman
*Assistant Examiner*—Chae Ko
(74) *Attorney, Agent, or Firm*—Trop, Pruner & Hu, P.C.

(57) ABSTRACT

Disclosed is a communication mechanism among hardware, firmware and system software in order to redirect interrupts or other hardware events to only one thread execution context of an error domain for a multi-threaded processing system. Other embodiments are also described and claimed.

23 Claims, 7 Drawing Sheets

OTHER PUBLICATIONS

Section 4.2 of Intel® Itanium® Processor Family System Abstraction Layer Specification, available at http://developer.intel.com/design/itanium/downloads/245359.htm.

Section 2.5.1 and Section 3.3 of Itanium Processor Family Error Handling Guide, available at http://developer.intel.com/design/itanium/downloads/249278.htm.

State Intellectual Property Office, P.R. China, First Office Action dated Oct. 31, 2008.

The Patent Office of the State Intellectual Property Office of the People's Republic of China, Second Office Action dated Sep. 11, 2009, in a related application.

* cited by examiner

METHOD AND APPARATUS FOR REDIRECTION OF MACHINE CHECK INTERRUPTS IN MULTITHREADED SYSTEMS

BACKGROUND

1. Technical Field

The present disclosure relates generally to information processing systems and, more specifically, to error handling in processor systems.

2. Background Art

Error handling in computer systems involve error detection and error recovery. In error recovery, errors should be contained and computer systems should be highly available. Computer systems utilizing error handling that is coordinated among processors, system logic hardware, firmware and operating system can contain errors and reduce the time computer systems are not available. Additionally, the processor(s), system logic hardware, firmware and operating system should have interfaces to one another to allow coordination between them during error handling.

System software is defined herein as any code, including firmware code, that is executed in a privileged mode, such as any code that runs at ring 0 privilege level. This definition of system software is intended to include the firmware and operating system (OS) kernel that is executed by a single CPU in a single processor system, or is executed by a plurality of CPUs in a multi-processor system. Thus, system software may include firmware, such as PAL and SAL code (discussed below), as well as operating system kernel software code.

Firmware as used herein refers to code routines that are stored in non-volatile memory structures such as read only memories (ROMs), flash memories, and the like. These memory structures preserve the code stored in them even when power is shut off. Even though firmware is stored in non-volatile memory, firmware may be copied or shadowed to volatile memory. Typically, this is done for performance reasons.

One of the principal uses of traditional firmware is to provide necessary instructions or routines that control a computer system when it is powered up from a shut down state, before volatile memory structures have been tested and configured. Firmware routines may also be used to reinitialize or reconfigure the computer system following various hardware events and to handle certain platform events like system interrupts.

Another typical use of traditional firmware is to provide complex sequences to be performed in processors that utilize complex instruction sets. A typical instruction in a CISC (complex instruction set computer) computer processor performs a series of operations, with microinstructions that define some of the more complex operations being encoded in a non-volatile storage area in the form of microcode. The microcode defines all or a portion of the executable instruction set for the processor, and may also define internal operations that are not implemented in software-accessible code. The microcode is typically placed in a read-only memory (ROM) within the processor at the time the processor is manufactured.

Operating systems (OS) interact with firmware to provide an environment in which applications can be executed by the CPU. By utilizing firmware, an OS can be designed to run on many different processing systems without re-writing the OS for each variation in platforms. For at least one embodiment, the term operating system, as used herein, is intended to broadly encompass any privileged software layer that performs scheduling, including a scheduling layer that is distributed over a cluster of platforms.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to redirect interrupts in a system having multiple thread execution contexts.

DETAILED DESCRIPTION

Figure 1:
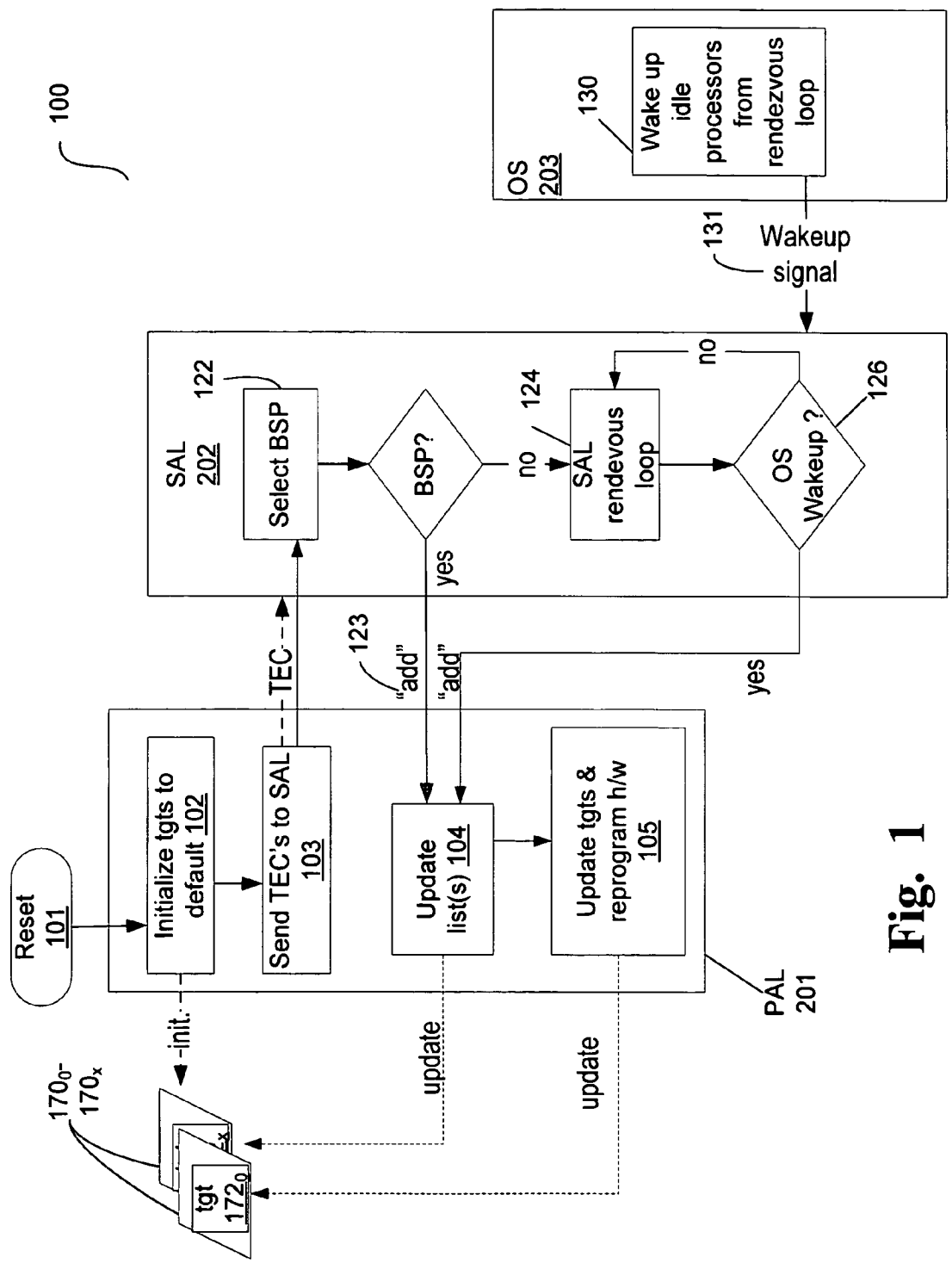
FIG. 1 is a data flow diagram illustrating at least one embodiment of a method for selecting, as thread execution units are added to an OS running system, one thread execution context to receive corrected machine check interrupts for the error domain of a shared resource in a multi-threaded computing system.

The following discussion describes selected embodiments of methods, systems and mechanisms to redirect machine-check interrupts in a system having multiple thread execution contexts (sometimes referred to herein as "TEC's") to only one of the contexts, which may then notify the operating system of the interrupt. The apparatus, system and method embodiments described herein may be utilized with single-core or multi-core systems. In the following description, numerous specific details such as processor types, boot processing, multithreading environments, system configurations, and specific API (Application Programming Interface) parameters have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

For at least one embodiment, firmware includes BIOS (basic input/output system) code and microcode that reside either on-chip, in ROM memory, or off-chip in other non-volatile memory, such as flash memory. Before a computer system can operate, it must have an operating system (OS) in its memory that allows the computer's resources to be reached and controlled by the other software, such as the various application programs. The computer hardware has a non-volatile, comparatively simple bootstrap program to perform a boot sequence and load the operating system from disk. Typically, the bootstrap program is invoked by the BIOS program.

For at least one other embodiment, firmware includes two major components, the processor abstraction layer (PAL) and the system abstraction layer (SAL). PAL and SAL may work together (possibly along with other firmware components, such as an Extensible Firmware Interface (EFI)) to provide processor and system initialization for an operating system boot. The PAL and SAL also work together, along with the operating system, to perform error handling.

The PAL is the firmware layer that abstracts the processor implementation—it encapsulates all processor model specific hardware. It encapsulates those processor functions that are likely to change based on implementation so that SAL firmware and operating system software can maintain a consistent view of the processor. The PAL thus provides a consistent software interface to access the processor resources across multiple different implementations of processor hardware.

SAL is a platform-specific firmware component that isolates operating system and other higher-level software from implementation differences in the platform. SAL is typically provided by original equipment manufacturers (OEM) and BIOS vendors.

In the following discussion, particular embodiments are shown in order to illustrate certain features of the invention. The particular illustrated embodiments include PAL and SAL firmware components. However, one of skill in the art will recognize that the principles discussed herein may be equally applied to other embodiments, including embodiments of systems that do not include PAL and SAL firmware components. For example, in such embodiments those PAL functions described below may be performed in hardware or microcode. Also, for example, those SAL functions described below may be performed by BIOS code or may also be performed by hardware circuitry.

Figure 2:
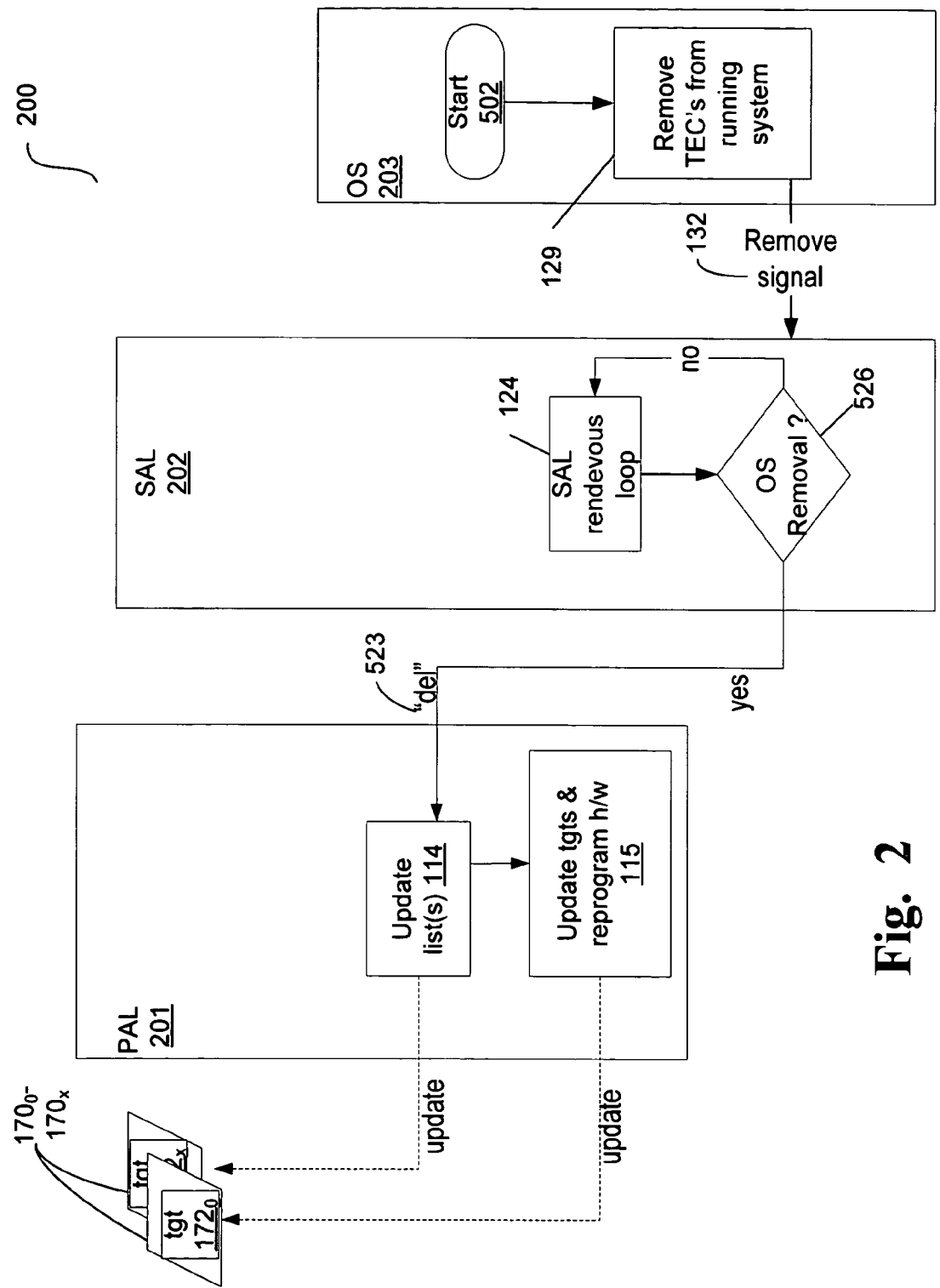
FIG. 2 is a data flow diagram illustrating at least one embodiment of a method for selecting, as thread execution units are removed from an OS running system, one thread execution context to receive corrected machine check interrupts for the error domain of a shared processor resource in a multi-threaded computing system.

Before discussing FIGS. 1 and 2 in detail, FIGS. 3, 6 and 7 will be discussed in order to provide background information relevant to the methods shown in FIGS. 1 and 2. Generally, FIG. 1 is a data flow diagram illustrating at least one embodiment of a method 100 for selecting, as thread execution units are added to an OS running system, one thread execution context to receive corrected machine check interrupts for the error domain of a shared resource in a multi-threaded computing system. FIG. 2 is a data flow diagram illustrating at least one embodiment of a method 200 for selecting a different thread execution context to receive corrected machine check interrupts for the error domain of a shared resource, as thread execution units are removed from an OS running system in a multi-threaded computing system.

Figure 3:
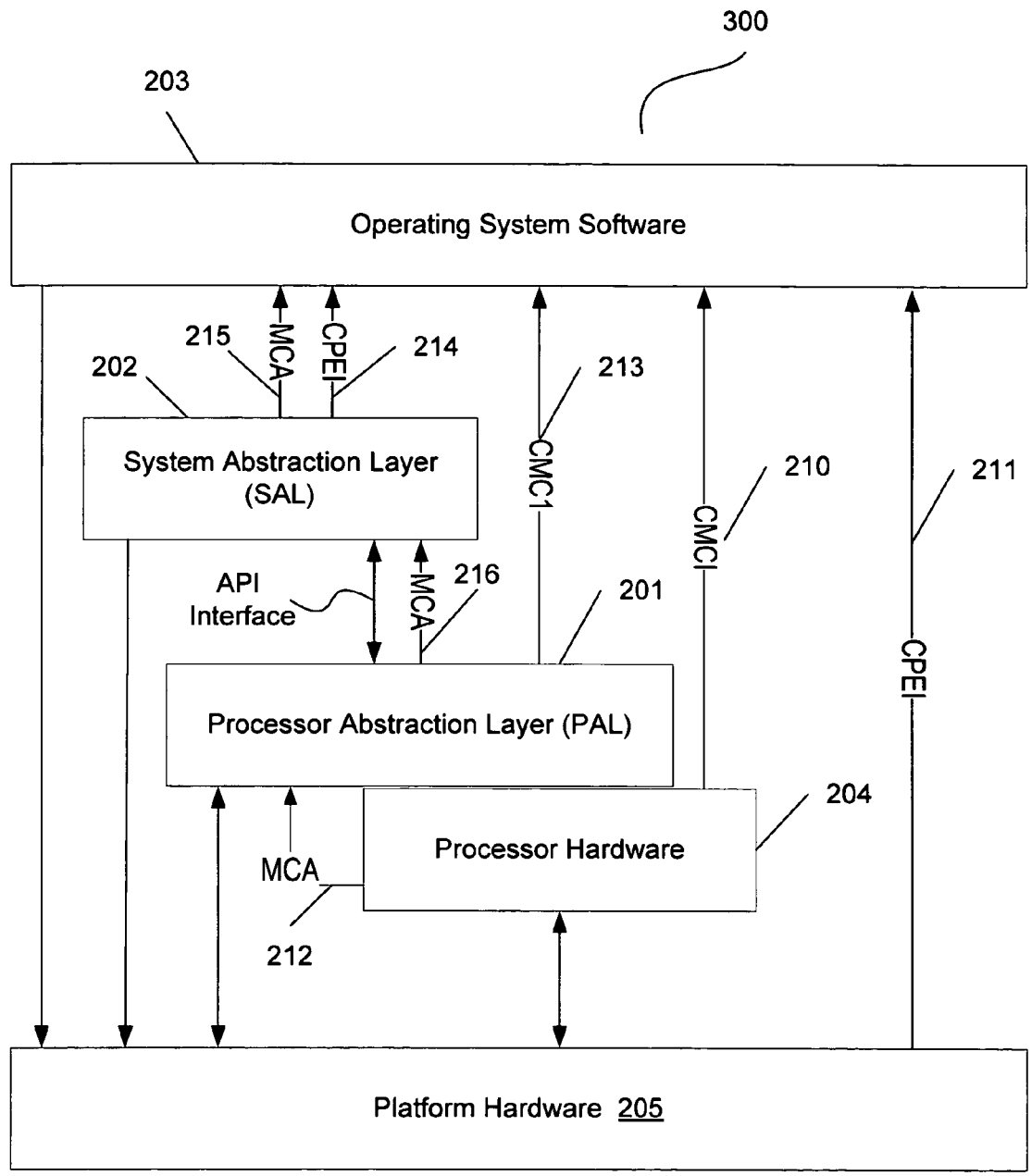
FIG. 3 is a block diagram illustrating at least one embodiment of a multi-layer system for error handling.

FIG. 3 is discussed below in order to provide information regarding embodiments of error handling coordinated among hardware, firmware and software layers of a computing system. FIG. 6 is discussed below in order to provide information regarding various types of thread execution contexts, which may include SMT logical processors and single-threaded cores. Then, FIG. 7 is discussed below in order to provide additional information regarding error domains. Thereafter, a detailed discussion of FIGS. 1 and 2 is set forth.

FIG. 3 illustrates at least one embodiment of a system 300 to perform coordinated error handling. The system 300 includes a PAL 201, SAL 202, and OS 203. The system 300 also includes processor hardware 204, which may include at least one multi-threaded (e.g., simultaneous multithreading, or "SMT") processor core or at least two single-threaded processor cores. The system 300 also includes platform hardware 205. The PAL 201 and SAL 202 are together known as firmware, for the illustrated embodiment. However, other embodiments may employ firmware, such as BIOS code and microcode that do not include PAL 201 and SAL 202.

The code for the PAL and SAL layers, for the illustrated embodiment, or for other firmware, such as BIOS and microcode for other embodiments, may reside in one or more non-volatile memories or persistent memories of the system. For example, the code may reside in flash read only memory (ROM). (Embodiments of systems that includes non-volatile memory are discussed in further detail below in connection with FIGS. 4 and 5). The code for these firmware layers may be shadowed to other memory devices. In the following discussion, it is intended that the terms PAL, SAL, and OS represent PAL, SAL, or OS code intended to be executed by a processor.

Processor hardware 204 represents one or more processors in a single- or multiple-core multi-threaded computer system and is not limited to a certain processor. The processor may be any of a variety of different types of processors that execute instructions. For example, the processor may be one or more general purpose processor cores such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

The processor hardware 204 is multi-threaded in the sense that it includes two or more thread execution contexts, such that two or more threads may execute concurrently. That is, one software thread may execute in each thread execution context. For instance, for at least one embodiment the processor hardware 204 is a multi-processor chip, known as a chip multiprocessor ("CMP"), where each of multiple single-threaded processor cores in a single chip package may each execute one of the multiple software threads concurrently.

For at least one other embodiment, referred to as simultaneous multithreading ("SMT"), each of one or more processor cores of the processor hardware 204 may be a single physical processor core that is made to appear as multiple logical processors to operating systems and user programs. For SMT, multiple software threads can be active and execute simultaneously on a single processor core without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

Accordingly, the processor hardware 204 may be a single multi-threaded processor, such as an SMT processor in a single chip package. Alternatively the processor hardware 204 may represent two or more SMT multi-threaded processor cores in a single chip package. Alternatively, the processor hardware 204 may be two or more single-threaded processor cores in the same CMP chip package. We now briefly turn to FIG. 6 for further detail regarding some different implementation schemes for embodiments of processor hardware 204.

Figure 6:
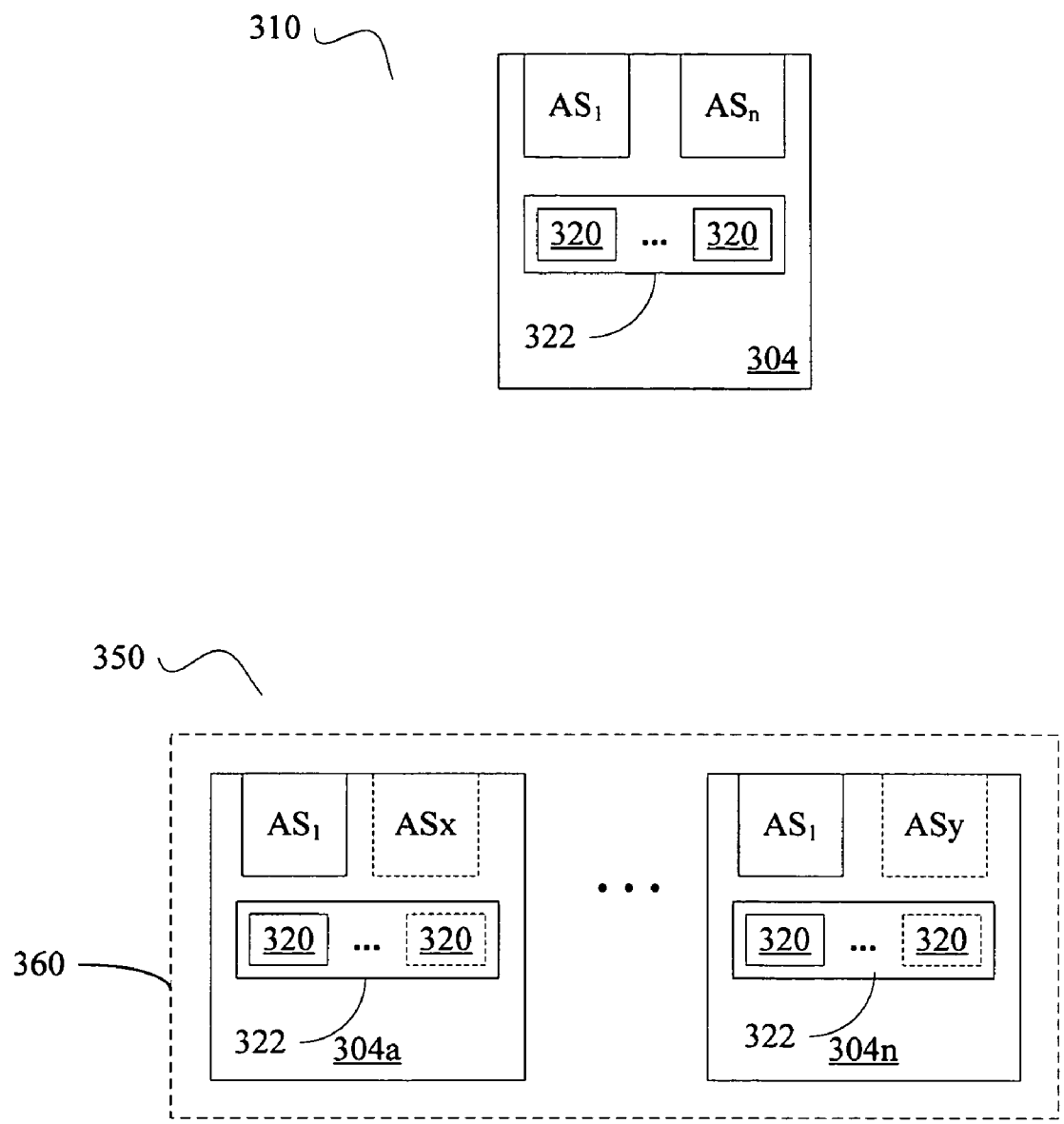
FIG. 6 is a block diagram illustrating selected hardware features of embodiments of a multi-threaded processor capable of performing disclosed techniques.

FIG. 6 is a block diagram illustrating selected hardware features of embodiments 310, 350 of a multi-threaded processor capable of performing disclosed techniques. FIG. 6 illustrates selected hardware features of an SMT multithreading environment 310 having multiple thread execution contexts (referred to as logical processors). FIG. 6 also illustrates selected hardware features of a multiple-core multithreading environment 350, where each thread execution context is a separate physical processor core.

For the SMT environment 310, a single physical processor 304 is made to appear as multiple logical processors (not shown), referred to herein as $LP_1$ through $LP_n$, to operating systems and user programs. Each logical processor $LP_1$ through LPn maintains a complete set of the architecture state $AS_1$-$AS_n$, respectively. The architecture state includes, for at least one embodiment, data registers, segment registers, control registers, debug registers, and most of the model specific registers. The logical processors $LP_1$-$LP_n$ share most other resources of the physical processor 304, such as caches, execution units, branch predictors, control logic and buses. Although such features may be shared, each thread context in the multithreading environment 310 can independently generate the next instruction address (and perform, for instance, a fetch from an instruction cache, an execution instruction cache, or trace cache).

Thus, the processor 304 includes logically independent next-instruction-pointer and fetch logic 320 to fetch instructions for each thread context, even though they may be implemented in a single physical fetch/decode unit 322. For an SMT or embodiment, the term "thread execution context" encompasses at least the next-instruction-pointer and fetch logic 320 for a thread context, along with at least some of the associated architecture state, AS, for that thread context. It should be noted that the thread execution contexts of an SMT system 310 need not be symmetric. For example, two SMT thread execution contexts for the same physical core may differ in the amount of architectural state information that they each maintain.

Accordingly, for at least one embodiment the multi-threading system 310 is a single-core processor 304 that supports concurrent multithreading. For such embodiment, each thread execution context is a logical processor having its own instruction next-instruction-pointer and fetch logic 320 and its own architectural state information AS, although the same physical processor core 304 executes all thread instructions. For such embodiment, the logical processor maintains its own version of the architecture state, although execution resources of the single processor core may be shared among concurrently-executing threads.

FIG. 6 also illustrates at least one embodiment of a multi-core multithreading environment 350. Such an environment 350 includes two or more separate physical processors 304a-304n that is each capable of executing a different software thread such that execution of at least portions of the different software threads may be ongoing at the same time. Each processor 304a through 304n includes a physically independent fetch unit 322 to fetch instruction information for its respective thread. In an embodiment where each processor core 304a-304n executes a single software thread, the fetch/decode unit 322 implements a single next-instruction-pointer and fetch logic 320 and maintains a single copy of the architecture state, $AS_1$. However, in an embodiment where each processor 304a-304n supports multiple thread contexts (e.g., each processor 304a-304n is an SMT core), the fetch/decode unit 322 implements distinct next-instruction-pointer and fetch logic 320 for each supported thread context and maintains a copy of the architecture state for each supported thread context. The optional nature of additional next-instruction-pointer and fetch logic 320 and of additional copies of the architecture state (see ASx and ASy) in a multiprocessor environment 350 are denoted by dotted lines in FIG. 6.

Accordingly, for at least one embodiment of the multi-core CMP embodiment 350 illustrated in FIG. 6, each of the thread execution contexts may be a processor core 304, with the multiple cores 304a-304n residing in a single chip package 360. Each core 304a-304n may be either a single-threaded or multi-threaded processor core. The chip package 360 is denoted with a broken line in FIG. 6 to indicate that the illustrated single-chip embodiment of a multi-core system 350 is illustrative only. For other embodiments, processor cores 304a-304n of a multi-core system 350 may reside on separate chips.

Regardless of the particular implementation of processor hardware 204, it is sufficient to note that the processor hardware 204 represents a single chip package (also referred to herein as a "socket") that supports multiple thread execution contexts that can concurrently execute multiple threads.

Returning now to FIG. 3, it is shown that components of system 300 illustrated in FIG. 3 may work in close cooperation to handle different error conditions of the system 300. System errors may be handled by each of the following components: platform hardware 205, processor hardware 204, PAL 201, SAL 202, and OS 203.

If the processor hardware 204 or platform hardware 205 corrects an error, it signals a notification of the corrected event to the OS 203 via a relatively low-priority interrupt. For processor-corrected events, this interrupt is referred to as a corrected machine check interrupt (CMCI) 210. For platform-corrected events, this interrupt is referred to as a corrected platform error interrupt (CPEI) 211. (For at least one embodiment, the OS 203 may choose to disable these interrupts 210, 211 and instead periodically poll firmware to collect information regarding corrected error events).

Further information regarding the generation and handling of corrected error interrupts may be found in Intel® Itanium® Architecture Software Developer's Manual-Volume 2: System Architecture, Revision 2.2, 2006, at sections 5.8.3.8 and 13.3.1. Additional information may also be found at section 4.2 of Intel® Itanium® Processor Family System Abstraction Layer Specification, 2003, and at sections 2.5.1 and 3.3 of Intel® Itanium® Processor Family Error Handling Guide, 2004. Each of these references is available from Intel Corporation.

It should be understood that the term "corrected error," as used herein, includes a broad range of types of hardware events. At the very least, a "corrected error" is an error that has been detected. In addition to detection, some action has been taken to ameliorate the error. It may be that the action taken results in complete correction of the error so that processing may continue without any further consequences from the error that was corrected. However, for other embodiments, the "corrected error" may have been partially corrected, or may have been logged or flagged for later correction. For at least one embodiment, for example, a parity or ECC (error correction code) error may be detected, but instead of immediately correcting the error a flag may be associated with the data associated with the errant parity/ECC code to indicate, for later processing, that the data has been "poisoned".

For at least one embodiment, when the processor hardware 204 detects an error that is not correctable directly by hardware, it may generate a hardware event or signal 212, called a machine check abort (MCA), when the error is one that threatens to damage the architectural state of the machine and may possibly cause data corruption. The MCA event 212 passes control to the firmware.

Both PAL 201 and SAL 202 include error handling routines. An error that the PAL 201 layer cannot correct may be passed to the SAL 202 (see MCA 216). The error handling routine of SAL 202 can use the PAL 201 set of procedures to obtain additional information from the processor or platform. FIG. 3 illustrates that the interface between PAL 201 and SAL 202 may be, for at least one embodiment, an API (Application Programming Interface), which is a set of calling conventions in programming that define how a service is invoked. More generally, the interface between PAL 201 and SAL 202 includes a mechanism for communicating events between the two layers.

The PAL and SAL error handling routines correct any errors that they are capable of correcting, if control is passed to them for an error that the processor hardware 204 or platform hardware 205 cannot correct. Processor-detected errors may be corrected by PAL 201, whereas platform-detected errors may be corrected by SAL 202.

The firmware handlers correct the errors, and then resume execution of the interrupted context. These firmware-corrected errors require no OS intervention for error handling. However, they may be signaled to the OS 203 so that the OS 203 may utilize information regarding corrected errors for reliability purposes (discussed below). Errors that are corrected by firmware layers are signaled to the OS 203 as a CMCI 213 (if corrected by PAL 201) or a CPEI 214 (if corrected by SAL 202). Again, the OS 203 may choose to disable these interrupts 213, 214 and instead poll the firmware for this information).

Corrected errors in the processor hardware 204 and platform hardware 205 may be logged by the OS 203 in NVRAM or on disk. For a system that provides high reliability, an OS 203 may choose to proactively act upon receiving a corrected error indication. For example, for at least one embodiment the OS 203 may employ predictive failure analysis (PFA) algorithms, which interpret the history of past corrected errors, and attempt to correlate these instances to a specific system component. This allows the OS 203 to take the errant component off line, and thus prevent a potential failure situation where the entire system is brought down by a fatal error in the errant component.

On the other hand, if an error is not correctable by firmware, control is passed to the OS 203 for further error handling (see MCA 215). That is, for errors which are not corrected by the error handling routine of SAL 202, execution branches or hands off from the error handling routine of SAL 202 to the error handling routine of OS 203.

If control is passed to the OS 203 for error handling, the OS 203 corrects the errors that it can, and then either returns control to the interrupted context, switches to a new context, or resets the system 200.

Figure 7:
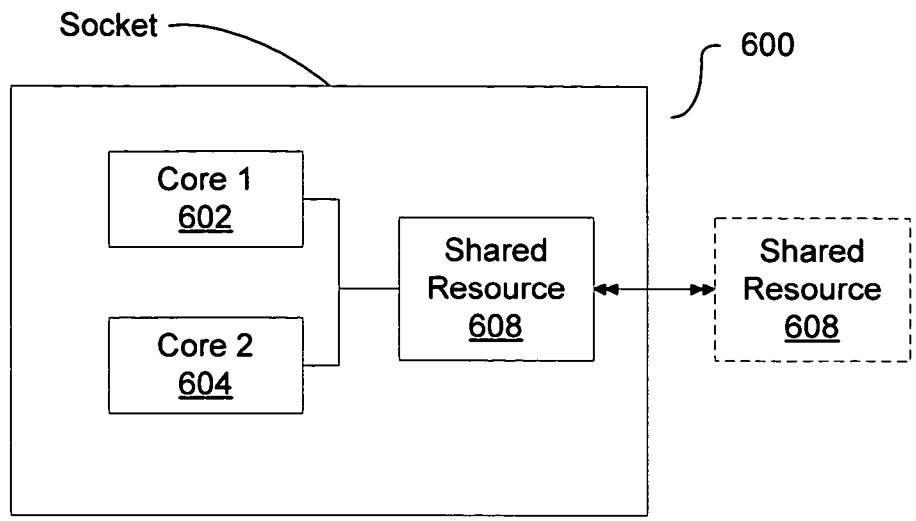
FIG. 7 is a block diagram illustrating different embodiments of multi-threaded systems that include shared processor resources.
Figure 7:
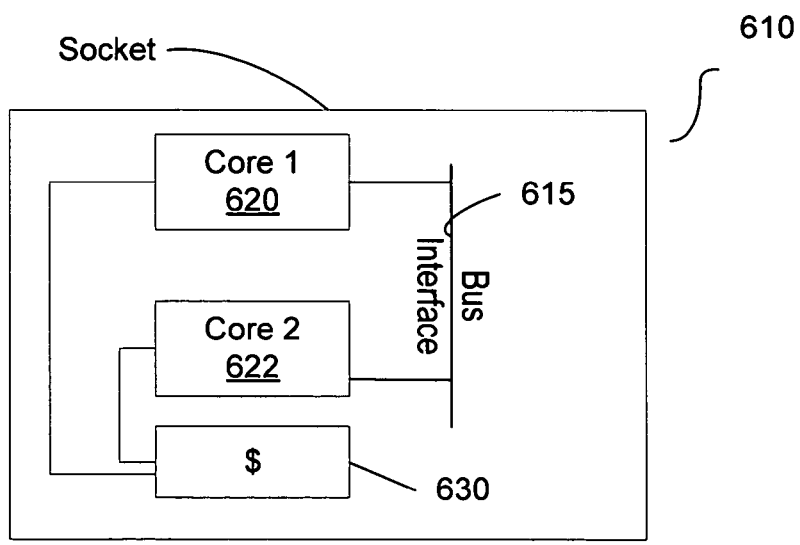
Figure 7:
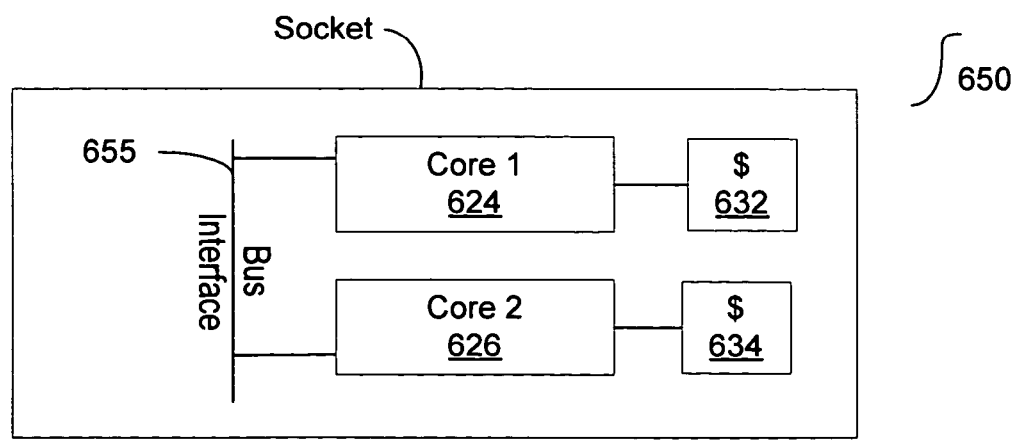

Reference is now made to FIG. 7 for a further discussion of shared resources as they relate to error handling in a multi-threaded system. FIG. 7 is a block diagram illustrating different multi-threaded systems 600, 610, 650 that include shared resources. The first system 600 generally shows two cores 602, 604 (which may be either single-threaded or multi-threaded cores) that share a resource 608. The cores 602, 604 provide for concurrent execution of software threads. The resource 608 may be any resource that is shared among thread contexts in a multithreading system, including a shared cache, DRAM or other memory, shared bus interface, or the like. The double arrows and dotted lines in FIG. 8 are intended to illustrate that the placement of the shared resource 608 may be either inside the chip package (or "socket") (see solid box for shared resource 608) or may optionally reside outside the socket (see broken box for shared resource 608).

For simplicity of example, specific embodiments of shared resources 608 discussed in connection with specific example systems 610 and 650 in FIG. 7. The specific embodiments of shared resource 608 illustrated in FIG. 7 include a shared data buffer 630 and shared bus interfaces 615, 655. However, such illustration should not be taken to be limiting. The shared resources 608 illustrated in FIG. 7 may be any resource that is shared in or among thread contexts.

Also, for simplicity, the multi-threaded systems 600, 610, 650 shown in FIG. 7 are CMP systems. However, one skilled in the art will appreciate that any other shared resource is equally applicable to the discussion of FIG. 7, as are other types of multi-threaded systems (such as a single-core SMT system that provides two or more logical processors to support concurrent execution of multiple software threads).

FIG. 7 illustrates a first system 610 that includes two processor cores 620, 622 and a second system 650 that includes two processor cores 624, 626. The two cores 620, 622 of the first system 610 share a data buffer 630, whereas the two cores 624, 626 of the second system 650 each has a dedicated data buffer 632, 634, respectively. The data buffers 630, 632, 634 may be any type of data buffer, including queues, buffers, caches or any other data storage structures. For simplicity of illustration, the data buffers 630, 632, 634 of FIG. 7 are shown as caches, although one of skill in the art will realize that the particular embodiments illustrated should not be taken to be limiting.

FIG. 7 also illustrates that the processor cores 620, 622 of the first system 610 share an interconnect 615. Similarly, the two processor cores 624, 626 of the second system 650 share an interconnect 650. The interconnects 610, 650 illustrated in FIG. 7 may be any type of communication pathway, including multi-drop buses or point-to-point interconnects, or any other type of communication pathway, including wireless interconnects. The interconnects 610, 650 may be utilized to communicate among any processing elements of a system. As such, the interconnects 610, 650 may be internal communication pathways (such as, e.g., internal buses) or external communication pathways (such as, e.g., an external point-to-point interconnect).

A corrected error for a shared resource may affect more than one thread execution context. For example, a corrected error in the shared cache 630 of system 610 may affect threads running on both Core 1 620 and Core 2 622. In a traditional single-core/single-threaded system, there is a 1:1 relationship between the resource and the thread execution context. If an error occurred on a resource (such as a cache or translation lookaside buffer, for example), the associated CMCI is delivered to the core where the resource resided.

However, this scheme becomes more complex in a multi-threaded system, such as an SMT system or CMP systems such as those 610, 650 illustrated in FIG. 7. Assuming that an instance of the OS is running on each of the cores 620, 622, the CMCI for a shared resource, such as cache 630, may be reported to the OS by each of the cores 620, 622. Accordingly, the OS may receive multiple corrected machine check interrupts for the same resource. Such approach preserves the 1:1 relationship between the error on the shared resource and the corresponding CMCI interrupt to the associated thread execution context. However, an inefficiency associated with this approach is that there are multiple CMCI interrupts generated (corresponding to each sharing thread execution context) for every corrected error event. This approach can lead to unnecessary OS overhead, especially for future processor architectures that may have significant numbers of cores and threads integrated on the same piece of silicon.

The set of execution contexts that share a resource is referred to herein as an "error domain." FIG. 7 illustrates that the two systems 610, 650 have differing error domains, even though both systems 610, 650 have two cores that share a single socket.

For both systems 610, 650 illustrated in FIG. 7, the error domain for shared bus interface 615 and 655 each includes two cores. The error domain for bus interface 615 includes Core 1 620 and Core 2 622 while the error domain for bus interface 655 includes Core 1 624 and Core 2 626.

Because the cores 624, 626 of system 650 each has a dedicated cache 632, 634, respectively, the error domain for each cache only includes one core. Thus, the 1:1 reporting scheme for corrected cache errors is preserved without the need to select a particular core for reporting CMCI interrupts regarding the caches 632, 634.

In contrast, the shared cache 630 in system 610 is shared by two processor cores 620, 622. Thus, the error domain for the shared cache 630 includes multiple thread execution contexts. For a CMP embodiment of single-threaded cores for system 610, the error domain for shared cache 630 includes two thread execution contexts: Core 1 620 and Core 2 622.

Discussed herein is a mechanism for reporting an error for a shared resource in a multi-threaded system to only one of the thread execution contexts in the error domain for that shared resource. One possible approach for doing so, which involves arbitrary selection of a fixed thread context to which to deliver CMCI interrupts, is relatively simplistic and does not adequately address certain high-reliability computing concerns.

For example, if the predetermined thread execution context chosen to receive CMCI's needs to be taken off-line for RAS (reliability, availability, serviceability) concerns or license-management issues, there may be no mechanism to ensure that the CMCI for errors is redirected to another thread execution context in the error domain. In such a scenario, the OS may not be notified when subsequent corrected errors occur on the shared resource.

Another potential drawback of such approach (that is, of selecting a fixed thread execution context to receive CMCI interrupts for an error domain) occurs if an instance of the operating system is not currently running on the fixed thread execution context. The running system of an OS is the subset of total thread execution contexts of a system on which an instance of the OS is running. Thread execution contexts that are in the running system are referred to herein as being "active", while those that are not in the running system (but are instead, e.g., in a rendezvous loop) are referred to herein as being "inactive."

In the case that a thread execution context is not in the running set but has been designated as the predetermined thread execution for CMCI reporting, the OS will not be notified when a corrected error occurs on the shared resource. Such a situation may occur, for example, if a thread execution context has been removed from the OS running system due to load balancing or capacity-on-demand reasons, RAS considerations, or due to licensing constraints with the OS software that limits the number of instances of the OS that may run on a given system.

FIG. 1 is a data flow diagram illustrating control and data flow for at least one method 100 for selecting one thread execution context to receive corrected error machine interrupts for an error domain. For at least one embodiment, the method 100 is performed during boot processing.

As is illustrated in FIG. 1, portions of the method 100 may be performed by hardware or PAL firmware 201, while others may be performed by SAL firmware 202, and yet others may be performed by the OS 203. However, it should be understood that, for at least one embodiment of the method 100, the actions taken by PAL 201 and SAL 202 during the method 100 are transparent to the OS 203.

That is, if an OS 203 is designed to operate correctly for a single-threaded system, the method 100 is designed to allow the OS to perform the same functions, without modification, even if the underlying implementation is a multithreaded system (be it a single or multiple SMT cores, or multiple single-threaded CMP cores). Accordingly, the following discussion focuses particularly on the portions of the method 100 illustrated in FIG. 1 that concern the communication mechanism between PAL 201 and SAL 202 in order to ensure that the thread context chosen as the CMCI recipient for a particular error domain does indeed have an instance of the OS 203 running on it.

More generally, it should be understood that FIG. 1 illustrates one specific embodiment of a general scheme for providing communication pathways between hardware and/or firmware to ensure consistency of reporting errors among different underlying hardware configurations. Although the discussion of FIG. 1, below, is focused on one particular embodiment—reporting of corrected machine check errors—one of skill in the art will recognize that the method 100 may also be applied to any other instance where there is a desire maintain OS transparency for idiosyncrasies of underlying hardware implementation.

A little more specifically, it should also be understood that, for the embodiment illustrated in FIG. 1, the SAL 202 is aware of thread execution contexts that are handed off to join the OS running system (see wakeup signal 131 of FIG. 1) and is also aware of thread execution contexts that are removed from the OS running system (see remove signal 132 of FIG. 2). However, because SAL 202 is removed by at least one layer of abstraction from the underlying hardware, SAL 202 is not aware of which processor resources are shared, and which thread execution contexts share them. In other words, SAL 202 has no information about shared resource error domains.

In contrast, PAL 210 does have information about the shared processor resource error domains. In addition, PAL 201 also has information about the implementation-specific mechanisms for redirecting a CMCI interrupt to a specific thread execution unit.

Accordingly, FIGS. 1 and 2 illustrate cooperative methods 100, 200 for the SAL 202 to notify the PAL 201 when thread execution units are added to, or taken out of, the OS running system. This allows the PAL 201 to avoid selecting a thread execution (for CMCI notification) that does not have an instance of the OS currently running on it.

FIG. 1 illustrates that certain data is maintained during the method 100. For example, FIG. 1 illustrates that PAL 201 maintains a list of thread execution contexts for each of x shared resource error domains. Thus, FIG. 1 illustrates lists $170_0$-$170_x$, with each list 170 corresponding to the list of thread execution contexts for a different error domain, where each error domain is associated with a particular shared resource on the processor. Each thread execution context listed in one of the lists $170_0$-$170_x$ is known to be part of the operating system's running system (e.g., the thread context is "active" in that it has an OS instance currently running on it).

For at least one embodiment, each list 170 is a global (e.g., package-wide) data structure that maintains a list of potential targets for each error domain. Data structure for the lists 170 may be maintained in any memory storage location, including memory storage and/or registers, as long as the storage location is accessible to all thread execution contexts in the package (for updating purposes).

In addition to each list 170, the PAL 201 may also maintain, for each list, one specific thread execution context that is designated as the "target" thread execution context for receiving CMCI's that occur on the particular shared resource. The target thread execution context for each list 170 is designated in FIG. 1 as the corresponding error domain's "target" 172. Of course, in certain instances, the target 172 for a particular error domain may be undefined (e.g., no thread execution units that share a particular resource are in the OS running set).

FIG. 1 illustrates that the method 100 begins at system reset 101. FIG. 1 illustrates that, responsive to detection of a reset event at block 101, execution begins at an entry point in PAL 201. It should be noted that, at reset 101, the lists 170a-170n corresponding to the different shared resources are all empty, because the OS 203 has not yet booted. However, at block 102 PAL 201 may pre-select an arbitrary default target 172 for each list 170. Processing then proceeds to block 103.

At block 103, the boot process of PAL 201 continues. During the boot process, PAL 201 performs processor testing and initialization. As part of this process, PAL 201 detects the thread execution contexts of the specific processor implementation and indicates them to SAL 202 at block 103. From block 103, PAL branches to an entry point 122 in SAL 202.

At block 122, SAL 202 performs platform testing and initialization. As part of this processing 122, SAL 202 selects a bootstrap processor (BSP) from among the thread execution contexts of the system that have been indicated to it by PAL 201 at block 103. All other thread execution contexts besides the BSP are placed into a rendezvous state at block 124. In the rendezvous state, all thread execution contexts in the computer system except for one (the BSP) enter an idle state. The thread execution contexts in the rendezvous loop remain idle until started by the OS (see block 130).

After selecting the bootstrap processor at block 122, SAL communicates 123 the event to PAL 201. For at least one embodiment, this communication 123 takes the form of an API call to an implementation-specific PAL procedure. Just by way of example, a sample API procedure call for this procedure may be characterized as follows:

Arguments:
  remove/add 0 to remove TEC from list of active thread execution contexts, 1 to add TEC to list of active thread execution contexts.

Returns:
  1 Returned if SAL requested removal of a TEC from the list of active thread execution contexts, and this resulted in the list of active thread execution contexts becoming empty (no TEC will receive shared error signaling going forward). 0, –2, –3 Successful completion, Invalid arguments, Completed with error Regardless of the specific implementation of the communication 123, it should be generally understood that PAL 201 receives the communication 123 that an event (e.g., selection of a thread execution context as a BSP) has occurred. In order to notify the PAL 201 that a thread execution context has been selected as a BSP and therefore is eligible to be a CMCI target 172, the SAL 202 may make a callback 123 to PAL 201 on the boot-strap processor (BSP), with an indication to "add" the boot-strap processor to the corresponding shared error reporting lists.

In response to the "add" callback communication 123, the PAL 201 updates 104 its tracking data for each appropriate shared resource list 170 in order to add the BSP to the list(s). Processing proceeds from block 104 to block 105.

At block 105, PAL 201 updates the target 172 for each appropriate list in order to indicate the boot-strap processor as the target, if the boot-strap processor is not the thread execution context selected at block 102 as the default target.

At block 105, the designated target TEC for each error domain may therefore be updated. Any time a target 172 is updated at block 105, the PAL 201 may reprogram the underlying hardware to route (also referred to herein as "redirecting") a CMCI interrupt only to the designated target TEC. Once this routing is set up, the signaling of the CMCI to the target TEC may be handled completely in hardware, with no firmware intervention (until if/when the target and routing needs to change). Thus, this redirecting 105 has the effect that CMCI interrupts will be routed only to a single TEC in the error domain, rather than to all of them.

As other thread execution contexts in the system are awakened, or made "active", by the OS 203 at block 130, the wakeup signal 131 is detected by the SAL 202 at block 126. Processing for the waking thread execution context proceeds from block 126 to block 104. At block 104, SAL 202 makes a callback to PAL 201 to "add" the waking thread execution context to the appropriate shared error reporting list(s) $170_0$-$170_x$.

Responsive to the "add" callback, PAL 201 executes block 104 for the waking thread execution context. At block 104, PAL 201 updates its tracking information for each appropriate shared resource list 170. Processing then proceeds to block 105. At block 105, PAL sets the waking thread execution context as the target 172 for the given shared resource error domain, if no active thread execution unit is currently selected as the target for the error domain. Again, PAL 201 also reprograms at block 105 the underlying hardware in order to facilitate CMCI signaling to the newly selected target.

The above processing (126, 104, 105) is repeated for each thread execution context that is awakened 130 by the OS during boot processing, thereby removing the awakened TEC from the rendezvous loop and adding it to the OS running system so that it is now "active".

FIG. 2 is a data flow diagram illustrating at least one embodiment of control and data flow for a method 200 of selecting a target thread execution context for error domains during system runtime processing as thread execution units are removed from the OS running system. Generally, FIG. 2 illustrates that the OS 203 may remove a thread execution context from its running system by indicating to the SAL 202 that the thread execution unit should be taken offline and sent back to the rendezvous loop—it becomes "inactive". When this happens, the PAL 201 should, accordingly, remove the offline TEC from its lists 170 and should no longer designate the offline TEC as a target for any error domain.

FIG. 2 illustrates that the method may be executed during system runtime, and starts at block 502. From block 502, further processing is triggered when the OS 203 signals 129 the SAL 202 that a TEC should be removed from the OS running system and should instead be moved to the SAL's rendezvous loop 124. FIG. 2 illustrates that the OS sends 129 a remove signal 132 to SAL 202. This remove signal 132 may be sent by the OS 203, for example, when the scheduler of the OS 203 determines that no load is available for execution on the TEC, or when the OS 203 quiesces a TEC in preparation for off-lining the TEC (due to RAS or licensing considerations, for example).

Responsive to the remove signal 132, SAL makes a callback to a PAL procedure to delete the removed TEC from the corresponding shared error reporting lists $170_0$-$170_x$. The callback communication 523 may be an API call, along the lines of that discussed above in connection with communication 123 of FIG. 1. For the "delete" callback, SAL 202 may provide "0" as the remove/add parameter, to indicate that the TEC should be removed from the appropriate shared error reporting lists $170_0$-$170_x$.

In response to the "delete" callback communication 523, the PAL 201 updates 114 its tracking data for each appropriate shared resource list 170 in order to delete the removed TEC from the list(s). Processing proceeds from block 114 to block 115.

At block 115, PAL 201 checks the target 172 for each appropriate list in order to determine whether the removed TEC is designated as a target 172 for any of the error domains. If the TEC that is being removed from the OS running system is currently indicated as the target 172 for any given shared resource, then at block 115 PAL 201 selects a different TEC from the list 170 as the target 172 for that list 170. Again, PAL 201 also reprograms the hardware to signal CMCI's for the error domain to the new target TEC. In this manner, the PAL 201 ensures that CMCI's reported on the shared resource are reported on a TEC that is part of the OS system runtime.

As other thread execution contexts in the system are removed from the running system by the OS 203 at block 129, the remove signal 132 is detected by the SAL 202 at block 526. Processing for the removal of the thread execution context proceeds from block 526 to block 114. At block 114, SAL 202 makes a callback to PAL 201 to "delete" the waking thread execution context from the appropriate shared error reporting list(s) $170_0$-$170_x$. The removed TEC's are disqualified from being a target 172 at block 115, and the hardware is reprogrammed accordingly.

Although not illustrated in FIG. 2, one of skill in the art will realize that, during runtime, a thread execution context may be removed from the rendezvous loop 124 by the OS 203 in order to be added to the OS running system (including any of the previously-removed thread execution contexts). In such cases, the processing (126, 104, 105) discussed above in connection with FIG. 1 is performed in order to update the lists 1700-$170_x$, and possibly update the targets 172, as the awakened TEC is removed from the rendezvous loop and added to the OS running system and becomes active.

Figure 5:
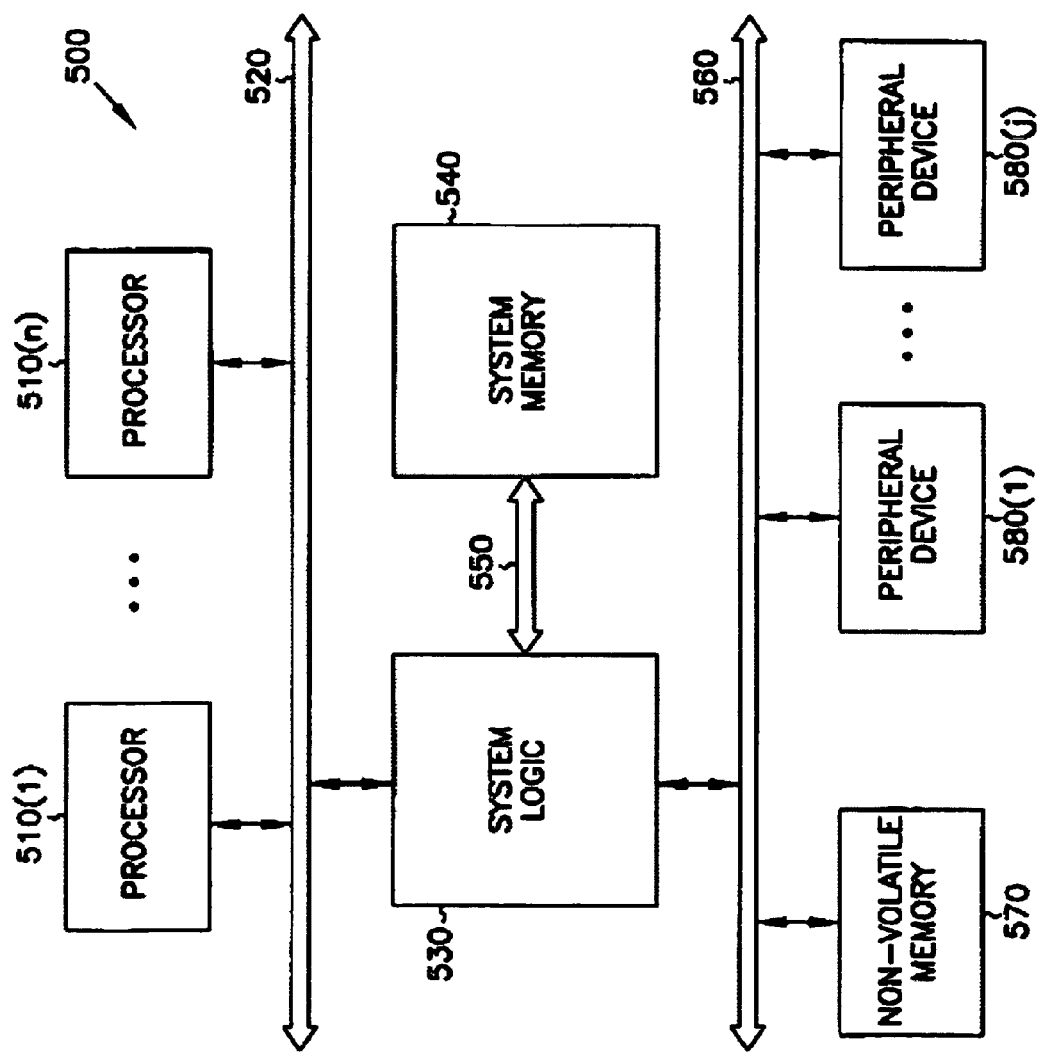
FIG. 5 is a block diagram of a multiprocessor system in accordance with an embodiment of the present invention that includes multi-drop bus communication pathways.

FIG. 5 is a block diagram of at least one embodiment of a computer system 500 that is suitable for implementing the present invention. The disclosed embodiment of computer system 500 includes one or more processors 510 that are coupled to system logic 530 through a processor bus 520. A system memory 540 is coupled to system logic 520 through bus 550. A non-volatile memory 570 and one or more peripheral devices 580(*l*)-580(*j*) (collectively, devices 580) are coupled to system logic 530 through peripheral bus 560. Peripheral bus 560 represents, for example, one or more peripheral component interconnect (PCI) buses, industry standard architecture (ISA) buses, extended ISA (EISA) buses, and comparable peripheral buses. Non-volatile memory 570 may be a static memory device such as a read only memory (ROM) or flash memory. Peripheral devices 580 include, for example, a keyboard, mouse or other pointing devices, mass storage devices such as hard drives and digital video discs (DVD), a display, and the like. These devices, together with system logic 530 define the computing platform for system 500.

For the disclosed embodiment of system 500, the at least one processor 510 may execute code or routines stored in system memory 540. The code for the operating system (OS) may be stored in the system memory 540. The processor also executes code from the non-volatile memory 570. The firmware including PAL and SAL may be stored in the non-volatile memory 570.

The system logic 530 may be a chipset, or a portion of a chipset. The system logic 530 may communicate with the processor(s) 370, 380 and control interaction between the processor(s) 510 and memory 540. For at least one embodiment, the system logic 530 communicates with the processor(s) 510 via a multi-drop bus, such as a frontside bus (FSB) 520.

Figure 4:
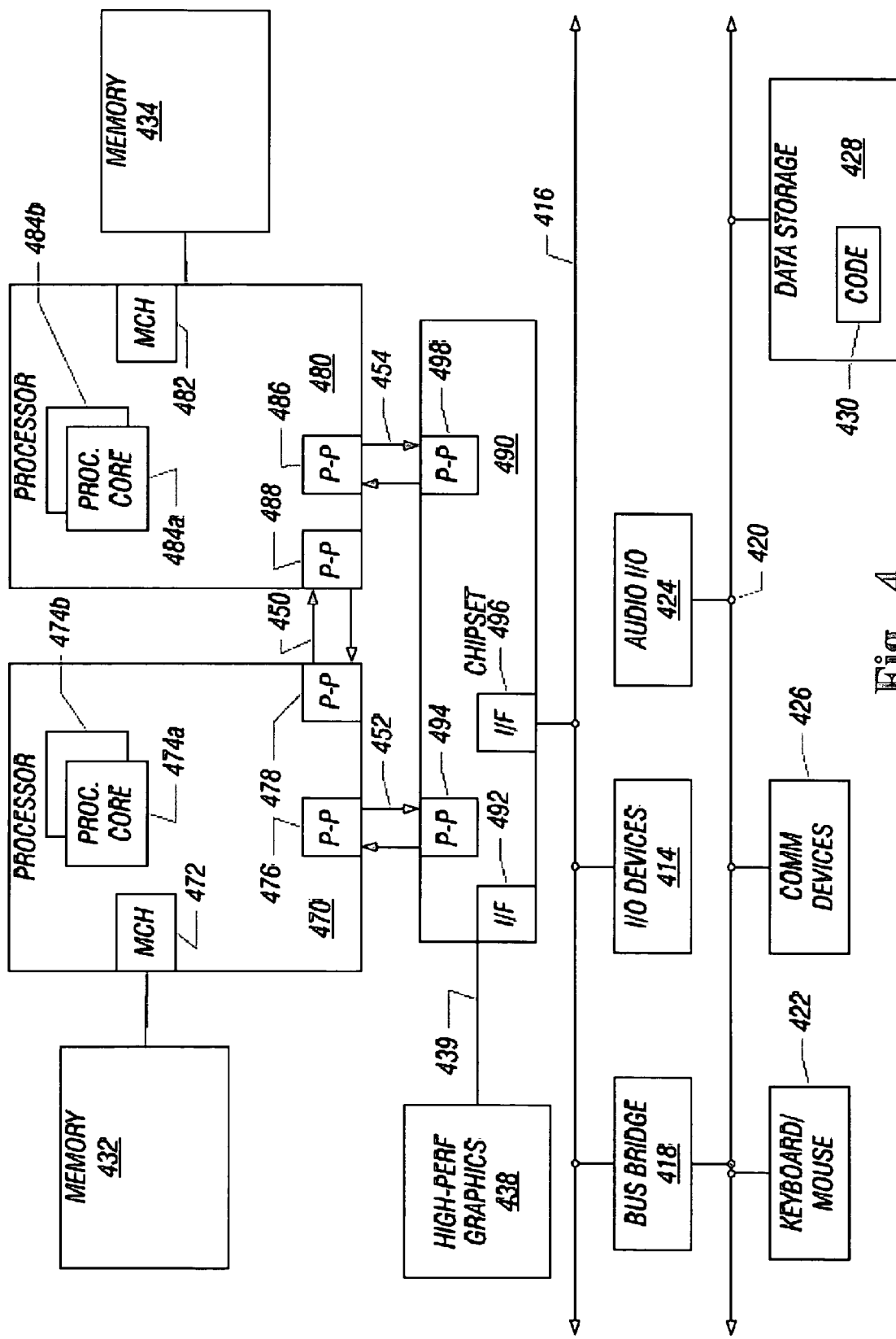
FIG. 4 is a block diagram of a multiprocessor system in accordance with an embodiment of the present invention that includes point-to-point interconnects.

Embodiments may be implemented in many different system types. Referring now to FIG. 4, shown is a block diagram of a multiprocessor system in accordance with another embodiment of the present invention. As shown in FIG. 4, the multiprocessor system is a point-to-point interconnect system, and includes a first processor 470 and a second processor 480 coupled via a point-to-point interconnect 450. As shown in FIG. 4, each of processors 470 and 480 may be multicore processors, including first and second processor cores (i.e., processor cores 474*a* and 474*b* and processor cores 484*a* and 484*b*).

The system 400 shown in FIG. 4 may instead have a hub architecture. The hub architecture may include an integrated memory controller hub Memory Controller Hub (MCH) 472, 482 integrated into each processor 470, 480. A chipset 490 may provide control of Graphics and AGP.

Thus, the first processor 470 further includes a memory controller hub (MCH) 472 and point-to-point (P-P) interfaces 476 and 478. Similarly, second processor 480 includes a MCH 482 and P-P interfaces 486 and 488. As shown in FIG. 4, MCH's 472 and 482 couple the processors to respective memories, namely a memory 432 and a memory 434, which may be portions of main memory locally attached to the respective processors.

While shown in FIG. 4 as being integrated into the processors 470, 480, the memory controller hubs 472, 482 need not necessarily be so integrated. For at least one alternative embodiment, the logic of the MCH's 472 and 482 may be external to the processors 470, 480, respectively. For such embodiment one or more memory controllers, embodying the logic of the MCH's 472 and 482, may be coupled between the processors 470, 480 and the memories 432, 434, respectively. For such embodiment, for example, the memory controller(s) may be stand-alone logic, or may be incorporated into the chipset 490.

First processor 470 and second processor 480 may be coupled to the chipset 490 via P-P interconnects 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a non-volatile data storage unit 428. For at least one embodiment, the non-volatile data storage unit may include code 430, including code for PAL and SAL. Further, an audio I/O 424 may be coupled to second bus 420. Note that other architectures are possible. For example, instead of the point-to-point architecture of FIG. 4, a system may implement a multi-drop bus (see FIG. 5) or another such architecture.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Accordingly, alternative embodiments of the invention also include machine-accessible media containing instructions for performing the operations of the invention or containing design data, such as HDL, that defines structures, circuits, apparatuses, processors and/or system features described herein. Such embodiments may also be referred to as program products.

Such machine-accessible media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language While particular embodiments of the present invention have been shown and described, it will be obvious to those skilled in the art that changes and modifications can be made without departing from the scope of the appended claims. For example, the embodiments discussed above of a mechanism for redirection of CMCI interrupts to a single TEC in an error domain, where the TEC is in the running system of the OS and where the mechanism is transparent to the OS, may be extended to systems that implement sub-socket partitioning. For such systems, more than one "target" TEC may be designated for a shared resource that spans partitions. An example of such an embodiment may include link or bus interface from the socket to the rest of the computer system. For such embodiment, at block 104 of FIG. 1, PAL 201 determines whether a TEC in the partition of the new TEC has already been set up as a target, when the new TEC is being added to the OS running system. If not, then at block 104 the PAL 201 may designate the newly added TEC as a target for the partition, even if a target TEC is already designated as a target for the shared resource, but in another partition. This results in multiple TEC's per error domain, but only one TEC per partition for the error domain. Of course, the hardware that implements CMCI routing need also support, for such embodiment, sending of the CMCI to multiple target TEC'S (that is, one TEC for multiple partitions).

Also, for example, the concepts discussed above may be applied for other types of hardware events, such as other types of interrupts, in alternative embodiments.

Also, for example, the redirection functionality described herein as being handled by firmware may, for at least one alternative embodiment, be implemented in hardware instead.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A system, comprising:
    a processor that includes a plurality of thread execution contexts for concurrent thread execution and also includes a resource that is shared by two or more of the thread execution contexts; and
    a first layer of system software to maintain a data structure to store a list of active ones of the thread execution contexts that share the resource and to maintain for the list only one of the thread execution contexts as a target thread execution context to receive a machine check interrupt that occurs on the resource, and to program redirection of the machine check interrupt to the target thread execution context to cause the target thread execution context to communicate the machine check interrupt to an operating system.

2. The system of claim 1, wherein the system software is further to program the redirection responsive to a communication that one of the plurality of thread execution contexts has been added by an operating system to a subset of the plurality of thread execution contexts.

3. The system of claim 1, further comprising:
    a DRAM memory module coupled to the processor.

4. The system of claim 1, wherein:
    the processor further comprises a single core that provides two or more logical processors for simultaneous multi-threading.

5. The system of claim 1, further comprising:
    a plurality of processor cores.

6. The system of claim 1, wherein:
    the shared resource is a data buffer.

7. The system of claim 1, wherein:
the shared resource is an interconnect.

8. The system of claim 2, wherein:
said system software includes a second layer to provide the communication.

9. The system of claim 8, wherein:
said second layer is further to communicate the added thread execution context to the first layer via a procedure call.

10. The system of claim 9, wherein:
said procedure call is defined to include a parameter to communicate to the first layer that one of the plurality of thread execution contexts has been removed from the subset.

11. The system of claim 1, wherein:
said system software is further to select for the redirection one of the thread execution contexts that shares the resource.

12. The system of claim 1, wherein:
said system software is further to select a target for the redirection from said list.

13. The system of claim 6, wherein:
the shared resource is a cache.

14. The system of claim 7, wherein:
the shared resource is a bus interface.

15. A method comprising:
selecting a first thread execution unit as a target to receive a notification for an event relating to a shared resource, the first thread execution unit present in a list for the shared resource of active thread execution units that share the resource, and programming processor hardware such that said notification is not to be routed to any thread execution unit that shares the resource except said target to enable the target to communicate the notification to an operating system;
receiving an indication that a second thread execution unit has been made active by the operating system, wherein the second thread execution unit shares the resource;
determining that the first thread execution unit is not active;
de-selecting the first thread execution unit as the target, selecting the second thread execution unit as the target, and removing the first thread execution unit from the list; and
re-programming said processor hardware such that said notification is to be routed only to said target.

16. The method of claim 15, wherein:
one or more additional thread execution units are to share said resource.

17. The method of claim 15, further comprising:
receiving an indication that the second thread execution unit has been made inactive by the operating system;
de-selecting the second thread execution unit as the target; and
re-programming said processor hardware such that said notification is not to be routed to the second thread execution unit.

18. The method of claim 15, further comprising:
detecting an event on the shared resource; and
generating said notification.

19. The method of claim 18, wherein:
said event is the occurrence of an error; and
wherein said method further comprises correcting said error.

20. An article comprising:
a tangible storage medium having a plurality of machine accessible instructions;
wherein, when the instructions are executed by a processor, the instructions provide for:
selecting a first thread execution unit as a target to receive a notification for an event relating to a shared resource, the first thread execution unit present in a list for the shared resource of active thread execution units that share the resource, wherein said notification is not to be routed to any thread execution unit that shares the resource except said target to enable the target to communicate the notification to an operating system;
receiving an indication that the second thread execution unit has been made active by the operating system, wherein the second thread execution unit shares the resource;
determining that the first thread execution unit is not active;
de-selecting the first thread execution unit as the target, selecting the second thread execution unit as the target, and removing the first thread execution unit from the list; and
re-routing hardware such that said notification is to be directed only to said target.

21. The article of claim 20, wherein said machine accessible instructions further comprise instructions that, when the instructions are executed by a processor, the instructions provide for:
receiving an indication that the second thread execution unit has been made inactive by the operating system;
de-selecting the second thread execution unit as the target; and
re-programming said processor hardware such that said notification is not to be routed to the second thread execution unit.

22. The article of claim 20, wherein said machine accessible instructions further comprise instructions that, when the instructions are executed by a processor, the instructions provide for:
detecting an event on the shared resource; and
generating said notification.

23. The article of claim 22, wherein said machine accessible instructions further comprise instructions that, when the instructions are executed by a processor, the instructions provide for:
correcting an error;
wherein said detected event is the error.

* * * * *